United States Patent
Lee et al.

(10) Patent No.: US 11,273,619 B2
(45) Date of Patent: Mar. 15, 2022

(54) MOLDED RESIN PRODUCT

(71) Applicants: HONDA MOTOR CO., LTD., Tokyo (JP); Continental Automotive GmbH, Hannover (DE); SUNARROW LTD, Tokyo (JP)

(72) Inventors: Seonghun Lee, Wako (JP); Ryo Gohara, Wako (JP); YoungJin Hyun, Boon Keng Road (SG); Takezo Takahata, Boon Keng Road (SG); Hiroki Imai, Tokyo (JP); Tomoomi Kiyomiya, Tokyo (JP)

(73) Assignees: HONDA MOTOR CO., LTD., Tokyo (JP); Continental Automotive GmbH, Hannover (DE); SUNARROW LTD, Tokyo (JP)

(*) Notice: Subject to any disclaimer, the term of this patent is extended or adjusted under 35 U.S.C. 154(b) by 162 days.

(21) Appl. No.: 16/831,897

(22) Filed: Mar. 27, 2020

(65) Prior Publication Data
US 2020/0316902 A1 Oct. 8, 2020

(30) Foreign Application Priority Data
Mar. 29, 2019 (JP) .............................. JP2019-066181

(51) Int. Cl.
*B32B 3/24* (2006.01)
*B32B 3/26* (2006.01)
(Continued)

(52) U.S. Cl.
CPC ................ *B32B 3/263* (2013.01); *B32B 3/02* (2013.01); *B32B 3/06* (2013.01); *B32B 3/18* (2013.01);
(Continued)

(58) Field of Classification Search
None
See application file for complete search history.

(56) References Cited

U.S. PATENT DOCUMENTS 3,654,062 A * 4/1972 Loew ...................... B32B 27/36
428/164
4,356,617 A * 11/1982 Coscia .................. B29C 31/042
118/315
(Continued)

FOREIGN PATENT DOCUMENTS

CN 1062398 A * 7/1992 ................ E02F 9/24
CN 103291710 A * 9/2013 ............. G09F 7/165
(Continued)

OTHER PUBLICATIONS

Machine Translation of JP-2009124485-A, Jun. 2009 (Year: 2009).*
Machine Translation of JP-2010274754-A, Dec. 2010 (Year: 2010).*

*Primary Examiner* — Jeffrey A Vonch
(74) *Attorney, Agent, or Firm* — Amin, Turocy & Watson, LLP (57) ABSTRACT

A molded resin product includes a design layer including a decorative layer having a first color, a shielding layer having a second color different from the first color, and a resin base layer. A cover layer formed of a polymer film is disposed close to one end of the design layer. Part of the decorative layer exposed from the shielding layer serves as an exposed region. The exposed region and part of the shielding layer constitute a pattern portion presenting a predetermined figure or character when viewed in plan through the cover layer. The rest of the shielding layer constitutes a base portion. The layer thickness of the base portion is set smaller than the layer thickness of the pattern portion in a region thereof where the shielding layer is formed.

15 Claims, 4 Drawing Sheets

US 11,273,619 B2
Page 2

(51) Int. Cl.
| | |
|---|---|
| *B32B 3/28* | (2006.01) |
| *B32B 3/30* | (2006.01) |
| *B32B 7/05* | (2019.01) |
| *B32B 7/12* | (2006.01) |
| *B32B 15/08* | (2006.01) |
| *B32B 27/08* | (2006.01) |
| *B32B 3/18* | (2006.01) |
| *B32B 3/06* | (2006.01) |
| *B32B 7/02* | (2019.01) |
| *B32B 7/023* | (2019.01) |
| *B32B 7/04* | (2019.01) |
| *B32B 3/02* | (2006.01) |
| B29C 65/50 | (2006.01) |
| B29C 65/78 | (2006.01) |
| E05B 19/24 | (2006.01) |
| G07C 9/00 | (2020.01) |
| *B32B 7/022* | (2019.01) |
| *B32B 15/095* | (2006.01) |
| *B32B 15/082* | (2006.01) |
| *B32B 27/30* | (2006.01) |
| *B32B 27/36* | (2006.01) |
| *B32B 27/40* | (2006.01) |
| *B32B 27/06* | (2006.01) |
| *B32B 7/14* | (2006.01) |
| E05B 19/26 | (2006.01) |

(52) U.S. Cl.
CPC .............. *B32B 3/266* (2013.01); *B32B 3/28* (2013.01); *B32B 3/30* (2013.01); *B32B 7/02* (2013.01); *B32B 7/023* (2019.01); *B32B 7/04* (2013.01); *B32B 7/05* (2019.01); *B32B 7/12* (2013.01); *B32B 15/08* (2013.01); *B32B 27/08* (2013.01); *B29C 65/50* (2013.01); *B29C 65/5064* (2013.01); *B29C 65/7805* (2013.01); *B29C 65/7814* (2013.01); *B32B 7/022* (2019.01); *B32B 7/14* (2013.01); *B32B 15/082* (2013.01); *B32B 15/095* (2013.01); *B32B 27/06* (2013.01); *B32B 27/304* (2013.01); *B32B 27/36* (2013.01); *B32B 27/40* (2013.01); *B32B 2250/03* (2013.01); *B32B 2250/04* (2013.01); *B32B 2250/05* (2013.01); *B32B 2250/44* (2013.01); *B32B 2255/205* (2013.01); *B32B 2255/26* (2013.01); *B32B 2255/28* (2013.01); *B32B 2307/20* (2013.01); *B32B 2307/402* (2013.01); *B32B 2307/4023* (2013.01); *B32B 2307/41* (2013.01); *B32B 2307/412* (2013.01); *B32B 2307/50* (2013.01); *B32B 2307/536* (2013.01); *B32B 2307/546* (2013.01); *B32B 2307/75* (2013.01); *B32B 2451/00* (2013.01); *E05B 19/24* (2013.01); *E05B 19/26* (2013.01); *G07C 9/00944* (2013.01); *Y10T 428/24008* (2015.01); *Y10T 428/24182* (2015.01); *Y10T 428/24298* (2015.01); *Y10T 428/24322* (2015.01); *Y10T 428/24331* (2015.01); *Y10T 428/24339* (2015.01); *Y10T 428/24488* (2015.01); *Y10T 428/24521* (2015.01); *Y10T 428/24545* (2015.01); *Y10T 428/24612* (2015.01); *Y10T 428/24628* (2015.01); *Y10T 428/24736* (2015.01); *Y10T 428/24777* (2015.01); *Y10T 428/24851* (2015.01); *Y10T 428/24868* (2015.01); *Y10T 428/28* (2015.01)

(56) References Cited

U.S. PATENT DOCUMENTS

| | | | | |
|---|---|---|---|---|
| 4,605,575 | A | * | 8/1986 | Auld ................. B29C 41/02 428/14 |
| 4,911,096 | A | * | 3/1990 | Munakata ......... B29C 45/14811 116/334 |
| 5,234,744 | A | * | 8/1993 | Kenmochi ................ B41J 5/12 200/310 |
| 5,333,549 | A | * | 8/1994 | Feldman ................ B41F 17/00 101/217 |
| 5,672,397 | A | * | 9/1997 | Bowers, Jr ........ B29C 45/14811 428/16 |
| 5,698,276 | A | * | 12/1997 | Mirabitur .............. B60R 13/005 156/242 |
| 5,806,957 | A | * | 9/1998 | Prior ..................... B60R 13/005 362/459 |
| 6,117,384 | A | * | 9/2000 | Laurin ............... B29C 45/14688 156/244.11 |
| 6,264,869 | B1 | * | 7/2001 | Notarpietro ......... B29C 45/1671 264/247 |
| 6,309,497 | B1 | * | 10/2001 | Gordon ................ B44C 1/1712 156/234 |
| 6,416,844 | B1 | * | 7/2002 | Robson .................... B44C 5/04 428/142 |
| 2002/0068148 | A1 | * | 6/2002 | Nakamura .............. B44C 1/222 428/131 |
| 2002/0142111 | A1 | * | 10/2002 | Auld ..................... B60R 13/005 428/13 |
| 2004/0125023 | A1 | * | 7/2004 | Fujii .................... H01Q 1/3291 343/700 MS |
| 2005/0181184 | A1 | * | 8/2005 | Obermann .............. B32B 27/30 428/195.1 |
| 2005/0223537 | A1 | * | 10/2005 | Hamilton ................ B44C 3/082 29/527.4 |
| 2005/0260386 | A1 | * | 11/2005 | Heinrich ............... B44C 1/1716 428/141 |
| 2007/0109206 | A1 | * | 5/2007 | Fujii .................... H01Q 1/3233 343/711 |
| 2007/0218269 | A1 | | 9/2007 | Kato et al. |
| 2008/0095992 | A1 | * | 4/2008 | Hirschfelder ..... B29C 45/14827 428/200 |
| 2008/0233367 | A1 | * | 9/2008 | Maeda ................ H01Q 1/3233 428/201 |
| 2008/0309579 | A1 | * | 12/2008 | Maeda ..................... H01Q 1/42 343/872 |
| 2010/0028610 | A1 | * | 2/2010 | Fujii .................... H01Q 1/3233 428/164 |
| 2010/0080939 | A1 | * | 4/2010 | Kastrup ................ B60R 13/005 428/31 |
| 2010/0136298 | A1 | * | 6/2010 | Marion ................... B60R 13/10 428/187 |
| 2011/0047784 | A1 | * | 3/2011 | Ohtake ..................... G01S 7/03 29/600 |
| 2011/0052839 | A1 | * | 3/2011 | Pierce ..................... G09F 13/16 428/31 |
| 2011/0088827 | A1 | * | 4/2011 | Zanini .................. B60R 13/005 156/63 |
| 2011/0123731 | A1 | * | 5/2011 | Zanini ..................... B44C 5/00 428/31 |
| 2012/0076958 | A1 | * | 3/2012 | Szymberski .......... B60R 13/005 428/31 |
| 2012/0076960 | A1 | * | 3/2012 | Greve .................. B60R 13/005 428/31 |
| 2012/0119961 | A1 | * | 5/2012 | Mayer Pujadas .... H01Q 1/3283 343/713 |
| 2012/0135162 | A1 | * | 5/2012 | Suzuki ..................... C08J 7/043 427/555 |
| 2012/0145523 | A1 | * | 6/2012 | Lust ......................... C23C 14/20 200/314 |
| 2012/0171414 | A1 | * | 7/2012 | Wieser ................. G06F 3/0202 428/134 |
| 2012/0237725 | A1 | * | 9/2012 | Stossel .................... B60R 13/04 428/139 |

(56) References Cited

U.S. PATENT DOCUMENTS

| | | | | |
|---|---|---|---|---|
| 2013/0078435 | A1* | 3/2013 | Massetti | B32B 7/02 428/195.1 |
| 2013/0101799 | A1* | 4/2013 | Trier | B29C 45/14811 428/164 |
| 2014/0093665 | A1* | 4/2014 | Horibe | B60R 13/04 428/31 |
| 2015/0027614 | A1* | 1/2015 | Mori | B32B 27/30 156/60 |
| 2015/0076851 | A1* | 3/2015 | Sugiura | B60R 13/04 296/1.08 |
| 2015/0086731 | A1* | 3/2015 | Sugiura | B44C 1/1729 428/31 |
| 2015/0140259 | A1* | 5/2015 | Sugiura | B60R 13/005 428/72 |
| 2015/0356895 | A1* | 12/2015 | Boppart | G09F 13/06 362/511 |
| 2016/0089850 | A1* | 3/2016 | Hamada | B32B 21/14 428/139 |
| 2016/0248152 | A1* | 8/2016 | Takao | H01Q 1/422 |
| 2016/0261034 | A1* | 9/2016 | Geise | C03B 21/02 |
| 2017/0057424 | A1* | 3/2017 | Yamada | G01S 13/931 |
| 2017/0136739 | A1* | 5/2017 | Okumura | B44C 3/025 |
| 2017/0231105 | A1* | 8/2017 | Abe | B44C 1/24 |
| 2017/0352938 | A1* | 12/2017 | Okumura | B60S 1/66 |
| 2018/0056910 | A1* | 3/2018 | Hong | B32B 15/04 |
| 2018/0254551 | A1* | 9/2018 | Guretzky | G01S 7/032 |
| 2019/0036205 | A1* | 1/2019 | Suzuki | H01Q 1/44 |
| 2019/0061646 | A1* | 2/2019 | Huttenlocher | F21S 43/50 |
| 2019/0111599 | A1* | 4/2019 | Matsuo | B29C 45/1643 |
| 2019/0275759 | A1* | 9/2019 | Nishio | C23C 14/024 |
| 2019/0283374 | A1* | 9/2019 | Lee | B32B 3/30 |
| 2019/0283397 | A1* | 9/2019 | Lee | B41F 15/08 |
| 2019/0356046 | A1* | 11/2019 | Mayer Pujadas | B60Q 1/0011 |
| 2019/0377060 | A1* | 12/2019 | Ochiai | H01Q 1/422 |
| 2020/0001570 | A1* | 1/2020 | Lee | B32B 1/00 |
| 2020/0339053 | A1* | 10/2020 | Bicego | B60R 13/005 |

FOREIGN PATENT DOCUMENTS

| | | | | |
|---|---|---|---|---|
| DE | 2930850 | A1 * | 2/1981 | B60R 13/04 |
| DE | 3418894 | A1 * | 11/1985 | B60R 13/0206 |
| DE | 3544217 | A1 * | 6/1987 | F16B 5/128 |
| DE | 19537185 | A1 * | 4/1996 | G09F 7/18 |
| DE | 102004021630 | A1 * | 12/2005 | G01S 13/931 |
| EP | 1902902 | A1 * | 3/2008 | B29C 45/1671 |
| EP | 1927480 | A2 * | 6/2008 | B60R 13/005 |
| FR | 2299788 | A7 * | 8/1976 | B32B 7/12 |
| FR | 2387708 | A1 * | 11/1978 | G09F 7/165 |
| FR | 2542829 | A1 * | 9/1984 | B60R 13/04 |
| JP | 59001236 | A * | 1/1984 | B29C 45/14688 |
| JP | 59095126 | A * | 6/1984 | B29C 45/14688 |
| JP | 2000071323 | A * | 3/2000 | B29C 45/16 |
| JP | 2001277285 | A * | 10/2001 | G01S 7/03 |
| JP | 2002135030 | A | 5/2002 | |
| JP | 2003202369 | A * | 7/2003 | G01S 7/4813 |
| JP | 2005-113085 | | 4/2005 | |
| JP | 2006287500 | A * | 10/2006 | |
| JP | 2007013722 | A * | 1/2007 | G01S 7/03 |
| JP | 2008284713 | A * | 11/2008 | |
| JP | 2009124485 | A * | 6/2009 | G01S 7/03 |
| JP | 2010030053 | A * | 2/2010 | |
| JP | 2010066152 | A * | 3/2010 | |
| JP | 2010099870 | A * | 5/2010 | |
| JP | 2010111010 | A * | 5/2010 | H01Q 1/3233 |
| JP | 2010137492 | A * | 6/2010 | |
| JP | 2010274754 | A * | 12/2010 | H01Q 1/44 |
| JP | 2011206650 | A * | 10/2011 | |
| JP | 2012107913 | A * | 6/2012 | |
| JP | 2012171315 | A * | 9/2012 | |
| JP | 2013049250 | A * | 3/2013 | |
| JP | 2013-166248 | | 8/2013 | |
| JP | 2014070899 | A * | 4/2014 | G01S 7/03 |
| JP | 2016150497 | A * | 8/2016 | |
| JP | 2017021231 | A * | 1/2017 | |
| JP | 2018114944 | A * | 7/2018 | |
| JP | 2019007776 | A * | 1/2019 | |
| KR | 20010016558 | A * | 3/2001 | B60R 13/005 |
| KR | 20030073517 | A * | 9/2003 | G01S 7/03 |
| KR | 100831740 | B1 * | 5/2008 | H01Q 1/44 |
| KR | 101369078 | B1 * | 2/2014 | B60R 13/04 |
| KR | 20170085753 | A * | 7/2017 | H01Q 1/02 |
| WO | WO-0221636 | A1 * | 3/2002 | H01Q 1/02 |
| WO | WO-2006042725 | A1 * | 4/2006 | B29C 45/16 |
| WO | WO-2019093022 | A1 * | 5/2019 | G01S 7/03 |
| WO | WO-2019115368 | A1 * | 6/2019 | C25D 7/00 |
| WO | WO-2019211252 | A1 * | 11/2019 | B60R 13/04 |
| WO | WO-2020038635 | A1 * | 2/2020 | B60R 13/02 |

* cited by examiner

MOLDED RESIN PRODUCT

CROSS-REFERENCE TO RELATED APPLICATION

This application is based upon and claims the benefit of priority from Japanese Patent Application No. 2019-066181 filed on Mar. 29, 2019, the contents of which are incorporated herein by reference.

BACKGROUND OF THE INVENTION

Field of the Invention

The present invention relates to molded resin products having visible patterns such as figures and characters formed inside.

Description of the Related Art

A molded resin product provided with a design layer and a cover layer disposed on one end surface of the design layer to protect the design layer (see Japanese Laid-Open Patent Publication No. 2013-166248) has been widely used as a component constituting, for example, the so-called smart key. A decorative pattern including figures and characters is formed inside the design layer and is visible to a user through the cover layer. In this manner, the decorative pattern is an essential element of appearance visible to the user.

In a case where the molded resin product includes an object to be joined to the design layer, a joint body such as a joint tape is attached to another end surface of the design layer. As described in Japanese Laid-Open Patent Publication No. 2005-113085, the object is joined to the design layer via the joint body.

SUMMARY OF THE INVENTION

It is assumed that the design layer may be joined to an object of which joint surface is curved. In this case, the design layer is required to be flexible enough to curve along the curved surface. Moreover, since the smart key is carried by the user, the molded resin product is required to be as light as possible.

A principal object of the present invention is to provide a molded resin product demonstrating sufficient flexibility.

Another object of the present invention is to provide a lightweight molded resin product.

According to an embodiment of the present invention, a molded resin product comprises:

a cover layer formed of a polymer film; and a design layer disposed close to one end surface of the cover layer and visible through the cover layer, wherein the design layer includes:

a decorative layer having a first color;

a shielding layer having a second color different from the first color and configured to cover a shielded region, which is part of the decorative layer, when viewed in plan through the cover layer; and a resin base layer disposed adjacent to the cover layer and configured to cover the shielding layer and an exposed region of the decorative layer exposed from the shielding layer, wherein the exposed region and part of the shielding layer constitute a pattern portion presenting a predetermined figure or character when viewed in plan through the cover layer and the resin base layer, wherein rest of the shielding layer except for the part of the shielding layer constitutes a plain base portion when viewed in plan through the cover layer and the resin base layer, and wherein a layer thickness of the base portion is set smaller than a layer thickness of the pattern portion in a region thereof where the shielding layer is formed.

According to the present invention, the layer thickness of the base portion is set smaller than the layer thickness of the pattern portion. Thus, the base portion, and by extension the design layer, can demonstrate sufficient flexibility. Consequently, in a case where the molded resin product includes an object to which the design layer is joined, the design layer can be easily joined to the object even when the joint surface of the object is curved. This results in the molded resin product with an excellent appearance.

Moreover, the weight of the molded resin product can be reduced since the layer thickness is small. Thus, in a case where the molded resin product constitutes portable equipment such as a smart key, the portable equipment becomes light and thus easy for the user to carry.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

A preferred embodiment of a molded resin product according to the present invention will be described in detail below with reference to the accompanying drawings.

Figure 1:
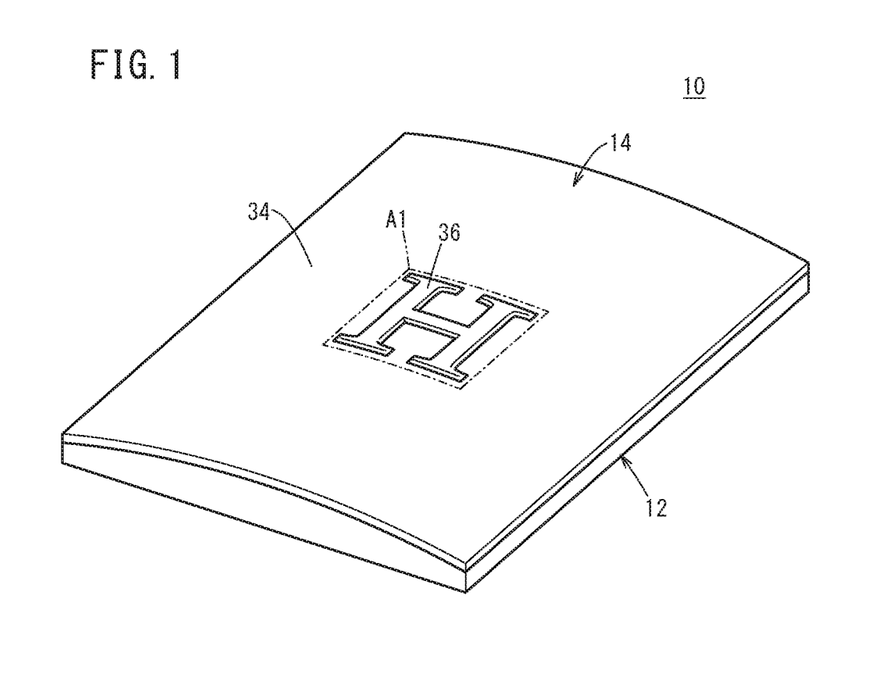
FIG. 1 is an overall schematic perspective view of a molded resin product according to an embodiment of the present invention.
Figure 2:
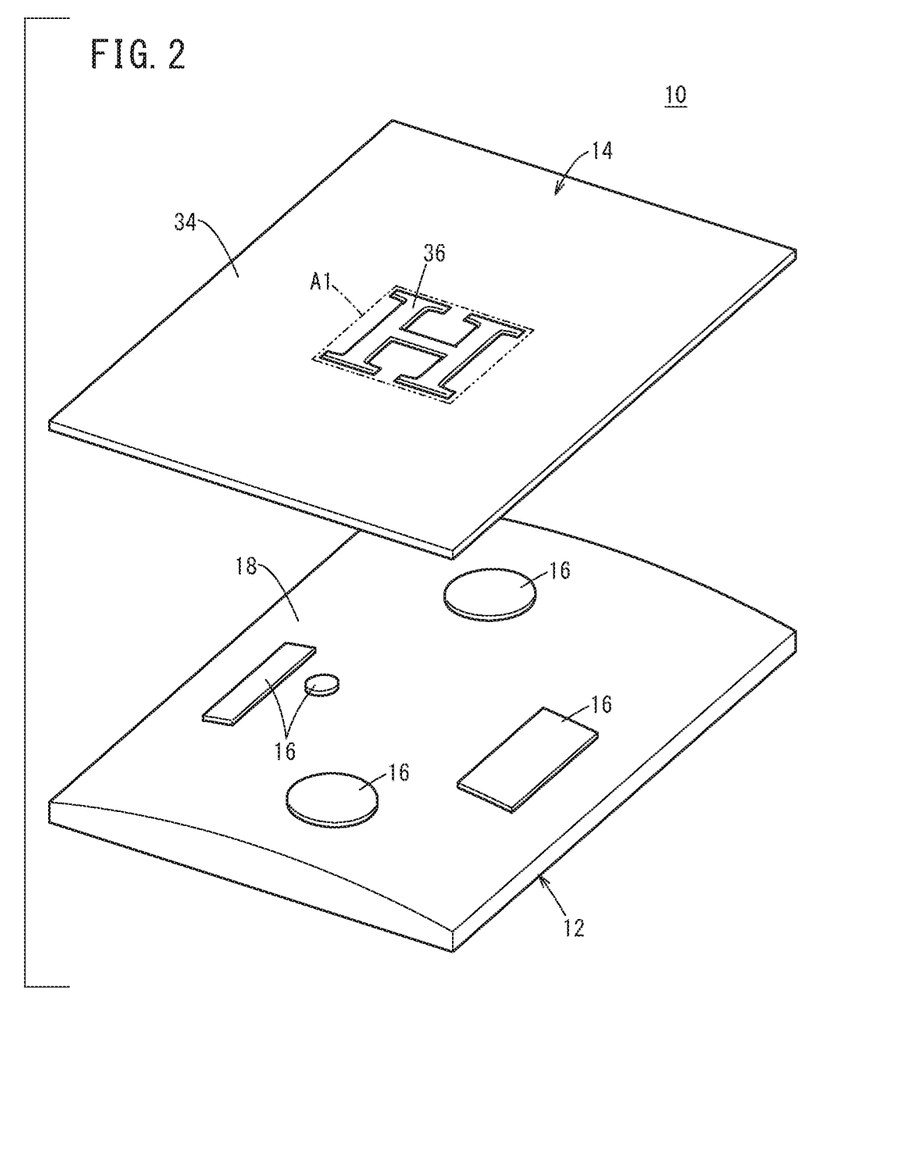
FIG. 2 is an exploded perspective view of the molded resin product in FIG. 1.
Figure 3:
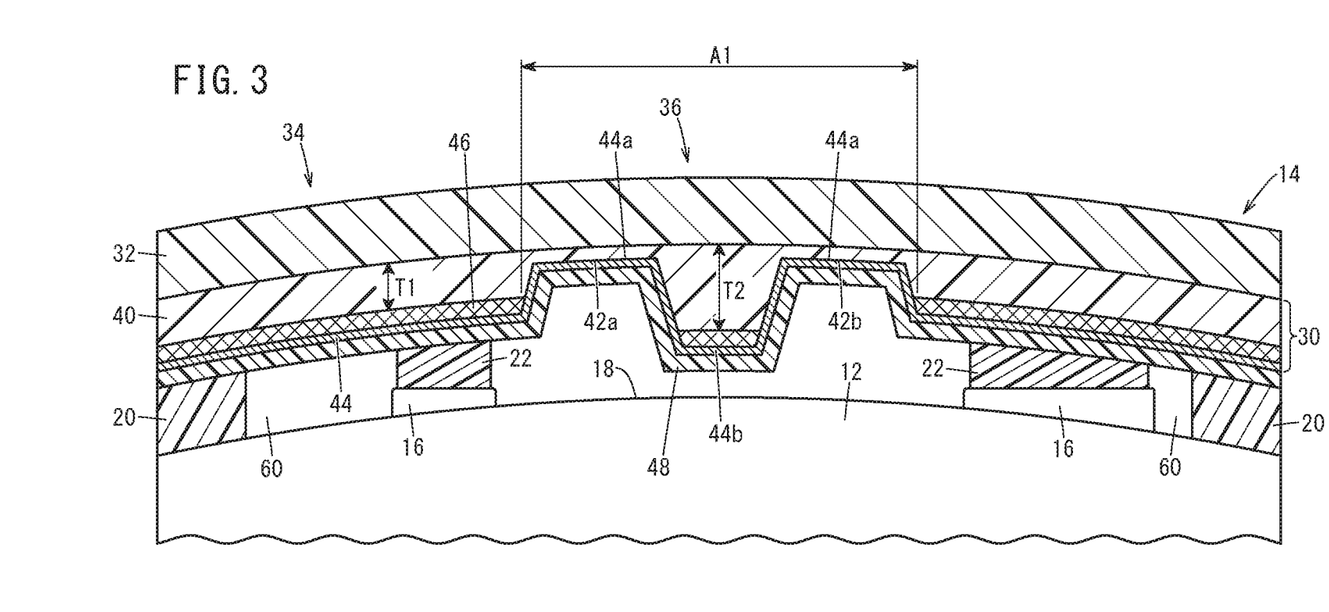
FIG. 3 is a cross-sectional view of the molded resin product in FIG. 1 taken along the direction of lamination (thickness direction)

FIGS. 1 to 3 are respectively an overall schematic perspective view, an exploded perspective view, and a cross-sectional view in the direction of lamination (thickness direction) of a molded resin product 10 according to this embodiment. The molded resin product 10 includes an object 12 and a laminate 14 joined to the object 12.

In the upper surface 18 of the object 12, end portions in the width direction are gently curved to expand from edge portions toward the middle in the width direction. In other words, the object 12 is slightly rounded.

In this case, the object 12 is a casing accommodating electronic components such as a circuit board (not illustrated) inside. As illustrated in FIGS. 2 and 3, a plurality of (five in FIG. 2) hollow protrusions 16 protrude from the flat upper surface 18 to prevent interference with the electronic components accommodated inside the object 12. Consequently, the flat upper surface 18 of the object 12 serves as a depression hollowed relative to the hollow protrusions 16.

The laminate 14 is joined to the object 12 via a joint tape 20 illustrated in FIG. 3. In addition, guide tapes 22 are disposed between the object 12 and the laminate 14. The joint tape 20 and the guide tapes 22 will be described later.

The laminate 14 includes a design layer 30 and a cover layer 32. The design layer 30 includes a base portion 34 and a pattern portion 36. In this case, the pattern portion 36 includes a decorative character "H". The decorative character "H" is visible to a user as if to be raised from the base portion 34 in a three-dimensional manner.

As illustrated in FIG. 3, the design layer 30 includes a resin base layer 40. Hereinafter, the bottom of the resin base layer 40 in FIG. 3 is referred to as the lower end, and the top is referred to as the upper end. The lower end is provided with two elongated depressions 42a and 42b extending into the page in FIG. 3. The depressions 42a and 42b respectively correspond to two longitudinal leg portions of the decorative character "H".

The depressions 42a and 42b are hollowed toward the upper end (toward the cover layer 32). Moreover, the depressions 42a and 42b become deeper as they become closer each other. That is, the depressions 42a and 42b are deepest at positions closest to each other and shallowest at positions farthest from each other. The depth of a depression (not illustrated) constituting a lateral bar portion of the decorative character "H" is substantially identical to the depth of the depressions 42a and 42b at the deepest parts.

A metal layer 44 (decorative layer) constituting the pattern portion 36 is disposed below the overall lower end surface of the resin base layer 40 including the depressions 42a and 42b. The metal layer 44 is covered with a print layer 46 serving as a shielding layer except for exposed regions 44a. When the user views the molded resin product 10 or the laminate 14 from above the cover layer 32, the exposed regions 44a are visible to the user. Adding a shine to the metal layer 44 further improves the design quality. The exposed regions 44a form an "H" shape as a whole and are visually identified as the decorative character "H" by the user.

Regions of the metal layer 44 except for the exposed regions 44a are shielded regions 44b covered (shielded) with the print layer 46. In other words, the print layer 46 is interposed between the resin base layer 40 and the metal layer 44 in the shielded regions 44b. As a result, the shielded regions 44b are hidden behind the print layer 46 and are invisible to the user using the molded resin product 10.

The print layer 46 has a different color from that of the metal layer 44. The print layer 46 is preferably black since the color increases the contrast between the print layer 46 and the shiny metal layer 44 and thus improves the appearance of the exposed regions 44a, in other words, the decorative character "H".

Materials suitable for the metal layer 44 include indium, tin, and alloys of these. In a case where the molded resin product 10 is used as a smart key, the smart key can communicate with a vehicle body without being interfered since radio waves can pass through those metals. On the other hand, materials suitable for the print layer 46 include urethane resin and vinyl chloride resin.

In this embodiment, the resin base layer 40 is composed of an ultraviolet curable resin. Since ultraviolet curable resins are relatively soft, the laminate 14 easily curves when subjected to an external force that causes the laminate 14 to curve. In this manner, the resin base layer 40 composed of an ultraviolet curable resin provides the laminate 14 with flexibility.

The print layer 46 is more flexible than the resin base layer 40. That is, the print layer 46 has a higher percentage of elongation than the resin base layer 40 and a lower Shore D hardness than the resin base layer 40. As a result, the print layer 46 and the metal layer 44 easily bend (curve) along the resin base layer 40. Thus, separation of the print layer 46 and the metal layer 44 from the resin base layer 40 caused by the differences in flexibility is prevented.

The percentage of elongation is measured in compliance with the so-called Method B specified in JIS K 7161 (based on the ASTM D 638). The percentages of elongation of the resin base layer 40 and the print layer 46 are, for example, about 1-100% and 1-200%, respectively. Moreover, the Shore D hardnesses of the resin base layer 40 and the print layer 46 are, for example, about 60°-90° and 70°-90°, respectively.

The upper end of the resin base layer 40 adjacent to the middle in the width direction is defined as a flat portion. The cover layer 32 is disposed on the upper surface of the resin base layer 40. The cover layer 32 is formed of a polymer film. Suitable examples of polymers include polyethylene terephthalate (PET).

The resin base layer 40 and the cover layer 32 are thin and transparent enough to pass light. For this reason, when the user views (looks down at) the molded resin product 10 in plan view from outside the cover layer 32, the exposed regions 44a of the metal layer 44, that is, the decorative character "H", is easily visible.

A holding layer 48 is disposed on the lower surface of the metal layer 44 to prevent the print layer 46 and the metal layer 44 from falling off the resin base layer 40. The holding layer 48 is composed of, for example, urethane resin, vinyl chloride resin, or the like, and has a shape along the metal layer 44.

The pattern portion 36 is a part inside a virtual area A1 (see FIGS. 1 and 2) enclosing the outermost edge portions of the decorative character "H". Thus, the pattern portion 36 includes the exposed regions 44a visually identified as the decorative character "H", the shielded regions 44b inside the virtual area A1, the print layer 46 covering the shielded regions 44b inside the virtual area A1, and the resin base layer 40 and the holding layer 48 inside the virtual area A1. In contrast, the base portion 34 is a part outside the virtual area A1. That is, the base portion 34 includes the shielded region 44b outside the virtual area A1, the print layer 46 covering the shielded region 44b outside the virtual area A1, and the resin base layer 40 and the holding layer 48 outside the virtual area A1.

As can be seen from FIG. 3, the thickness T1 of the resin base layer 40 in the base portion 34 (outside the virtual area A1) is set smaller than the thickness T2 of the resin base layer 40 in a region thereof where the print layer 46 is formed in the pattern portion 36 (inside the virtual area A1). As a result, the layer thickness in the base portion 34 is smaller than the layer thickness in the pattern portion 36 in the region thereof where the print layer 46 exists. Note that the layer thickness in the pattern portion 36 at the depressions 42a and 42b, which is the sum total of the thicknesses of the holding layer 48, the metal layer 44 (the exposed regions 44a), and the resin base layer 40, is smaller than the two layer thicknesses described above.

Moreover, the joint tape 20 (joint body) for joining the laminate 14 to the object 12 and the guide tapes 22 (guide body) brought into contact with the hollow protrusions 16 during joining are attached to the base portion 34. The joint tape 20 is a double-sided tape, and the guide tapes 22 are single-sided tapes. Moreover, the joint tape 20 is thicker than the guide tapes 22.

The joint tape 20 is disposed at a position corresponding to the flat upper surface 18 of the object 12. On the other hand, the guide tapes 22 are disposed at positions corresponding to the hollow protrusions 16. Consequently, the joint tape 20 and the guide tapes 22 are separated from each other. Note that either the joint tape 20 or the guide tapes 22 are not disposed on the pattern portion 36. Moreover, the adhesive surfaces of the guide tapes 22 face the lower end surface of the laminate 14.

The molded resin product 10 according to this embodiment is basically configured as above. Next, the operational effects thereof will be described.

The laminate 14 is affixed to the object 12 (for example, casing of a smart key) via the joint tape 20. When the laminate 14 is placed on top of the object 12 before being affixed, the posture, position, and the like of the laminate 14 may be set such that the guide tapes 22 are disposed above the hollow protrusions 16 to be brought into contact with the hollow protrusions 16. This determines the positions of the laminate 14 and the object 12 relative to each other, enabling the laminate 14 to be easily affixed, in other words, joined to the object 12.

Since the guide tapes 22 are single-sided tapes, the guide tapes 22 are only brought into contact with the hollow protrusions 16 and are not involved in joining the design layer 30 of the laminate 14 to the object 12. In other words, only the joint tape 20, which is a double-sided tape, is involved in joining the design layer 30 (laminate 14) to the object 12. As a result, while the adhesion is still insufficient immediately after the joint tape 20 is temporarily affixed to the object 12, the position of the laminate 14 can be easily adjusted before the laminate 14 is pressed against the object 12.

Figure 4:
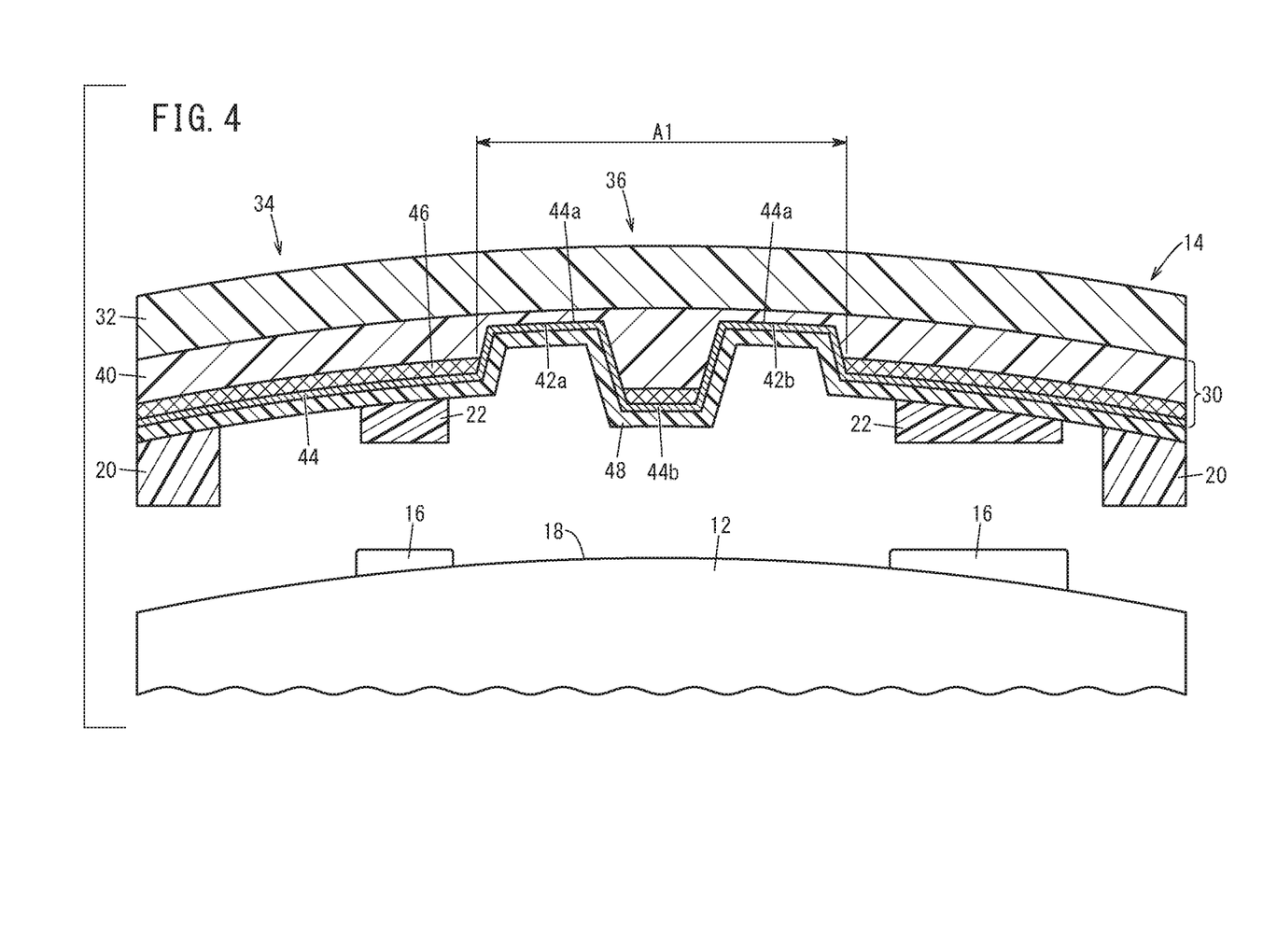
FIG. 4 is a schematic cross-sectional view of a principal part illustrating a state where a laminate constituting the molded resin product in FIG. 1 is curved to be joined to an object.

In the case where the curved surfaces exist at the end portions of the object 12 in the width direction as illustrated in FIG. 4, the laminate 14 curves along the curved surfaces of the object 12. The resin base layer 40 is composed of an ultraviolet curable resin, which is relatively flexible. Moreover, in this embodiment, the thickness T1 of the resin base layer 40 in the base portion 34 (outside the virtual area A1) is smaller than the thickness T2 of the resin base layer 40 at the print layer 46 in the pattern portion 36 (inside the virtual area A1). As a result, the flexibility of the resin base layer 40 is sufficiently increased.

Moreover, the print layer 46 is flexible compared with the resin base layer 40. For this reason, the print layer 46 easily bends (curves) along the resin base layer 40. Thus, the laminate 14 can easily curves due to its excellent flexibility, and the molded resin product 10 can be easily affixed to the rounded object 12.

In addition, since the thickness T1 of the resin base layer 40 in the base portion 34 is sufficiently small, the layer thickness of the overall laminate 14 and the weight of the molded resin product 10 are reduced.

To join the laminate 14 to the object 12 via the sufficient adhesion of the joint tape 20, a worker presses the laminate 14 against the object 12 using their fingers. In a case where the joint tape 20 or the guide tapes 22 are affixed to the pattern portion 36, it is assumed that the joint tape 20 or the guide tapes 22 are squashed and spread over wider areas than the metal layer 44 or the print layer 46 when the laminate 14 is joined to the object 12. In this case, the joint tape 20 or the guide tapes 22 may be visible when viewed from the side on which the cover layer 32 lies and may ruin the appearance of the laminate 14.

However, in this embodiment, the joint tape 20 and the guide tapes 22 are not affixed to the pattern portion 36 but only to the base portion 34. This eliminates the above-described concern. That is, the excellent appearance of the laminate 14, and by extension the molded resin product 10, can be maintained.

Furthermore, the thin guide tapes 22 are disposed at the positions corresponding to the hollow protrusions 16, and the thick joint tape 20 is disposed at the position corresponding to the flat upper surface 18 serving as the depression relative to the hollow protrusions 16. Thus, even when the laminate 14 including the design layer 30 and the cover layer 32, which are both thin, is joined to the object 12, protrusions or a depression corresponding to the hollow protrusions 16 or the upper surface 18 is prevented from being formed in the design layer 30 and the cover layer 32. That is, the cover layer 32 becomes substantially flat although the joint surface of the object 12 is uneven.

In addition, the laminate 14 is less depressed when the worker presses the laminate 14. For the above-described reasons, the appearance of the pattern portion 36, in particular, the decorative character "H" is improved.

Yet moreover, the joint tape 20 and the guide tapes 22 are separated from each other (see FIG. 3, in particular). As a result, flow paths 60 are formed between the joint tape 20 and the guide tapes 22. When the laminate 14 is joined to the object 12, in other words, when the laminate 14 and the object 12 are brought into firm contact with each other, the air lying between the laminate 14 and the object 12 is discharged to the outside through the flow paths 60. This prevents the air from remaining between the laminate 14 and the object 12 and thereby prevents air bubbles from being produced.

The molded resin product 10 is obtained by joining the laminate 14 to the object 12. When the user visually checks the molded resin product 10 from the side on which the cover layer 32 lies, only the regions of the metal layer 44 not shielded with the print layer 46, that is, the exposed regions 44a in the depressions 42a and 42b, are visible. Since the depressions 42a and 42b have three-dimensional shapes hollowed toward the cover layer 32, the user identifies the decorative character "H" in the pattern portion 36 as a three-dimensional decoration. In this manner, according to this embodiment, the pattern portion 36 including the decorative character "H" with an excellent three-dimensional appearance can be easily provided.

The present invention is not limited in particular to the embodiment described above, and various modifications can be made thereto without departing from the scope of the present invention.

For example, the holding layer 48 may be formed as required, that is, may be omitted depending on the joint strength between the metal layer 44 and the resin base layer 40.

Moreover, although the laminate 14 is affixed to the curved surface of the object 12 in this embodiment, the laminate 14 may be affixed to a flat, uncurved surface as a matter of course.

What is claimed is:
1. A molded resin product comprising:
a cover layer formed of a polymer film;
a design layer disposed close to a lower surface of the cover layer and visible through the cover layer, wherein the design layer includes:

a decorative metal layer, wherein the metal layer allows for passing of radio waves without being interfered;

a shielding layer having a color different from that of the metal layer, the shielding layer covering a part of the metal layer forming a shielded region of the metal layer and an exposed region of the metal layer exposed from the shielding layer when viewed in plan through the cover layer; and a resin base layer disposed between the cover layer and the design layer, covering the shielding layer and the exposed region of the metal layer, wherein the exposed region and a part of the shielded region constitute a pattern portion presenting a predetermined figure or character when viewed in plan through the cover layer and the resin base layer, wherein a remaining part of the shielded region constitutes a plain base portion when viewed in plan through the cover layer and the resin base layer, and wherein a total thickness of the base portion is smaller than a total thickness of the pattern portion where the part of the shielded region informed and the total thickness of the base portion is larger than a total thickness of the pattern portion in a region where the exposed region is formed.

2. The molded resin product according to claim 1, wherein a layer thickness of the resin base layer where the base portion is formed is smaller than a layer thickness of the resin base layer where the part of the shielded region is formed.

3. The molded resin product according to claim 2, wherein the layer thickness of the resin base layer where the base portion is formed is larger than a layer thickness of the resin base layer where the exposed region is formed.

4. The molded resin product according to claim 3, wherein the exposed region is formed as protruding above a surface of the shielded region.

5. The molded resin product according to claim 1, further comprising a holding layer adjacent to the design layer, disposed below the metal layer.

6. The molded resin product according to claim 1, wherein the shielded layer is a print layer.

7. The molded resin product according to claim 6, wherein the color is black.

8. The molded resin product according to claim 6, wherein the resin base layer comprises an ultraviolet curable resin.

9. The molded resin product according to claim 6, wherein a percentage of elongation of the resin base layer is about 1-100% and a percentage of elongation of the print layer is 1-200%, wherein the percentage elongation of the print layer is higher than that of the resin base layer.

10. The molded resin product according to claim 6, wherein a Shore D hardness of the resin base layer is about 60-90 and a Shore D hardness of the print layer is about 70-90, wherein the Shore D hardness of the print layer is lower than that of the resin base layer.

11. The molded resin product according to claim 1, further comprising:

an object joined to the base portion via a joint body.

12. The molded resin product according to claim 11, wherein:

the object includes a protrusion protruding toward the design layer, and a depression hollowed relative to the protrusion; and the depression is joined to the base portion via the joint body, and a guide body brought into contact with the protrusion is provided in the base portion.

13. The molded resin product according to claim 12, wherein a thickness of the joint body is larger than a thickness of the guide body.

14. The molded resin product according to claim 12, wherein the joint body and the guide body are separated from each other.

15. The molded resin product according to claim 12, wherein the joint body is a double-sided tape, and the guide body is a single-sided tape.

* * * * *

UNITED STATES PATENT AND TRADEMARK OFFICE
CERTIFICATE OF CORRECTION

PATENT NO. : 11,273,619 B2
APPLICATION NO. : 16/831897
DATED : March 15, 2022
INVENTOR(S) : Lee et al.

It is certified that error appears in the above-identified patent and that said Letters Patent is hereby corrected as shown below:

In the Claims

Line 20, in Column 7, in Claim 1:
"informed" should read "is formed"

Signed and Sealed this
Fourteenth Day of June, 2022

Katherine Kelly Vidal
*Director of the United States Patent and Trademark Office*